(12) United States Patent
Li et al.

(10) Patent No.: US 6,501,579 B2
(45) Date of Patent: Dec. 31, 2002

(54) APPARATUS, SYSTEM, AND METHOD FOR EXTRACTING AN OPTICAL CLOCK SIGNAL FROM AN OPTICAL DATA SIGNAL

(75) Inventors: Guifang Li, Oviedo, FL (US); Weiming Mao, Orlando, FL (US)

(73) Assignee: Optium, Inc., Orlando, FL (US)

( * ) Notice: Subject to any disclaimer, the term of this patent is extended or adjusted under 35 U.S.C. 154(b) by 0 days.

(21) Appl. No.: 09/798,626

(22) Filed: Mar. 1, 2001

(65) Prior Publication Data
US 2001/0038481 A1 Nov. 8, 2001

Related U.S. Application Data

(60) Provisional application No. 60/186,583, filed on Mar. 3, 2000.

(51) Int. Cl.[7] .............................................. H04B 10/00
(52) U.S. Cl. ....................... 359/158; 359/161; 359/181; 359/189
(58) Field of Search ................................ 359/158, 189, 359/161, 181, 135

(56) References Cited

U.S. PATENT DOCUMENTS

| | | | | |
|---|---|---|---|---|
| 5,444,560 A | * | 8/1995 | Barnsley | 359/158 |
| 5,457,559 A | * | 10/1995 | Saito et al. | 359/135 |
| 5,548,433 A | * | 8/1996 | Smith | 359/158 |

\* cited by examiner

*Primary Examiner*—Kinfe-Michael Negash
(74) *Attorney, Agent, or Firm*—McDermott, Will & Emery

(57) ABSTRACT

An apparatus of the invention includes a non-linear optical element (NLOE) and an optical frequency discriminator (OFD). The NLOE receives an optical data signal, and introduces chirp at the leading and trailing portions of the optical pulse(s) therein or induces chirp on a continuous wave (CW) optical source coupled to the NLOE. The OFD is coupled to receive the chirped signal, and uses this signal to generate an optical clock signal. The OFD discriminates frequency content associated with chirp to enhance the optical clock signal, and may also suppress non-chirp frequency content such as may be associated with an optical carrier signal or a continuous wave (CW) signal. Related systems and methods are also disclosed.

54 Claims, 13 Drawing Sheets

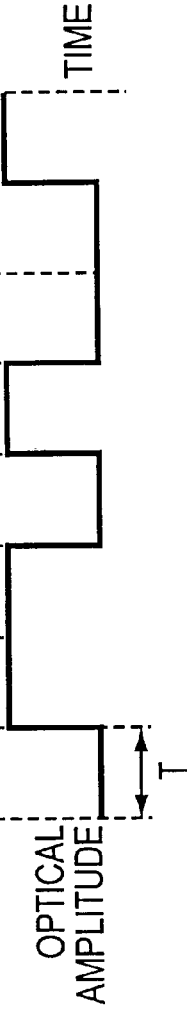
FIG. 1A
OPTICAL CLOCK SIGNAL
PRIOR ART
FIG. 1B
RETURN-TO-ZERO (RZ)
OPTICAL DATA SIGNAL
PRIOR ART
FIG. 1C
NON-RETURN-TO-ZERO (NRZ)
OPTICAL DATA SIGNAL
PRIOR ART

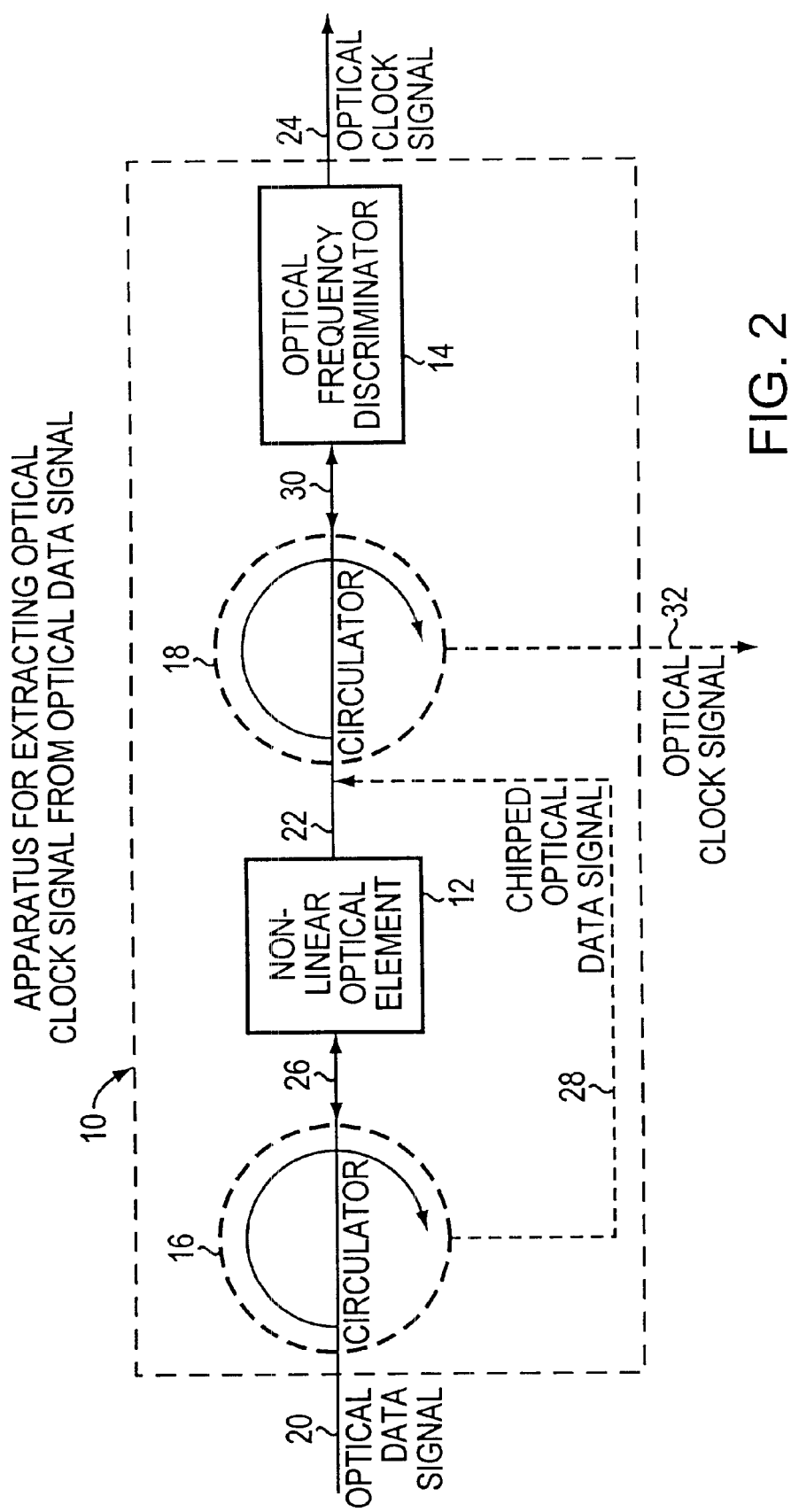

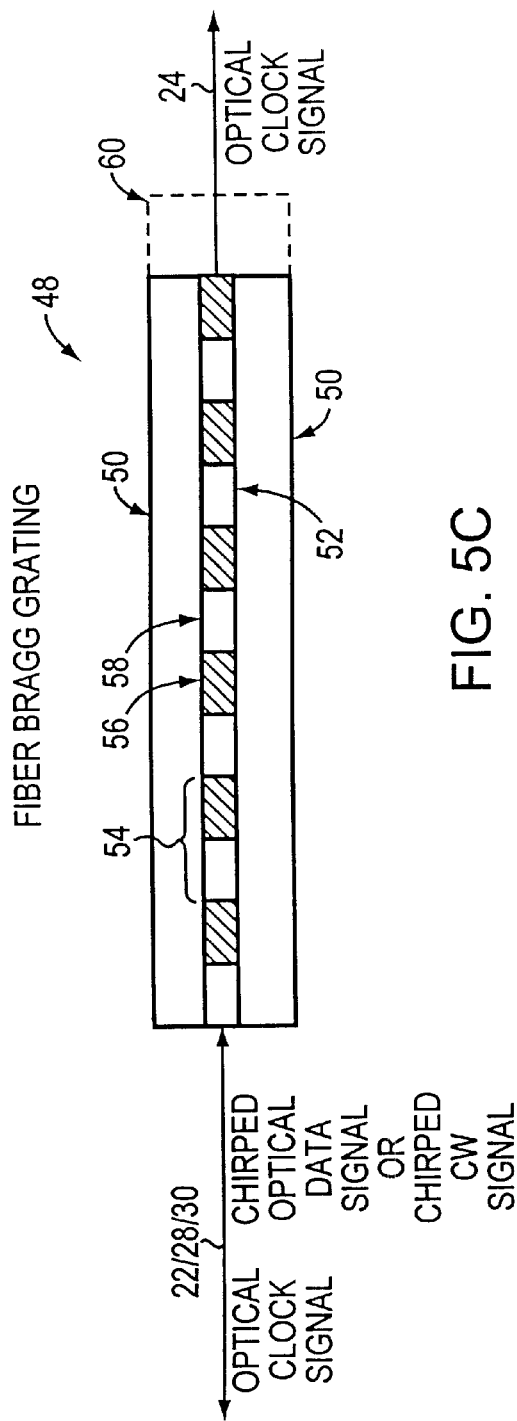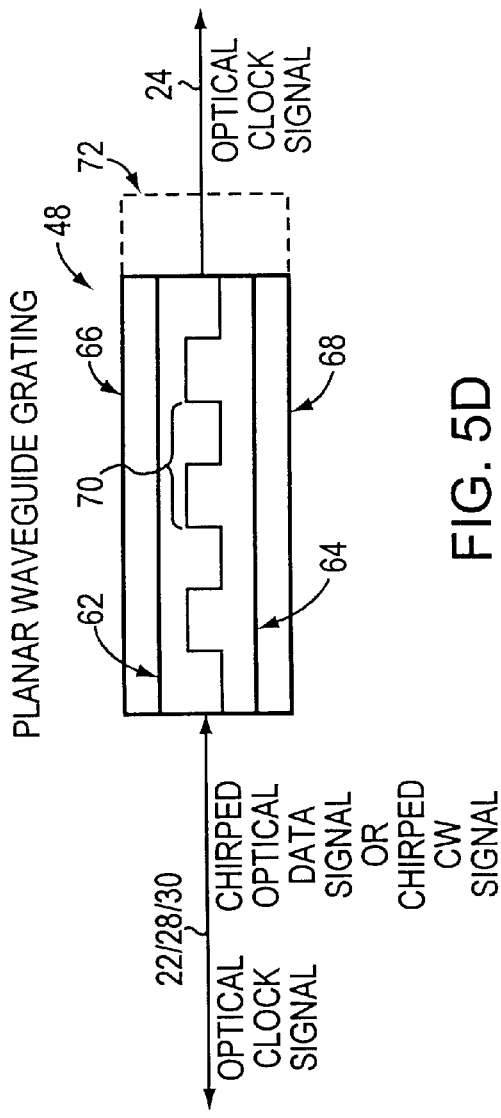
FIG. 5C  FIBER BRAGG GRATING
FIG. 5D  PLANAR WAVEGUIDE GRATING

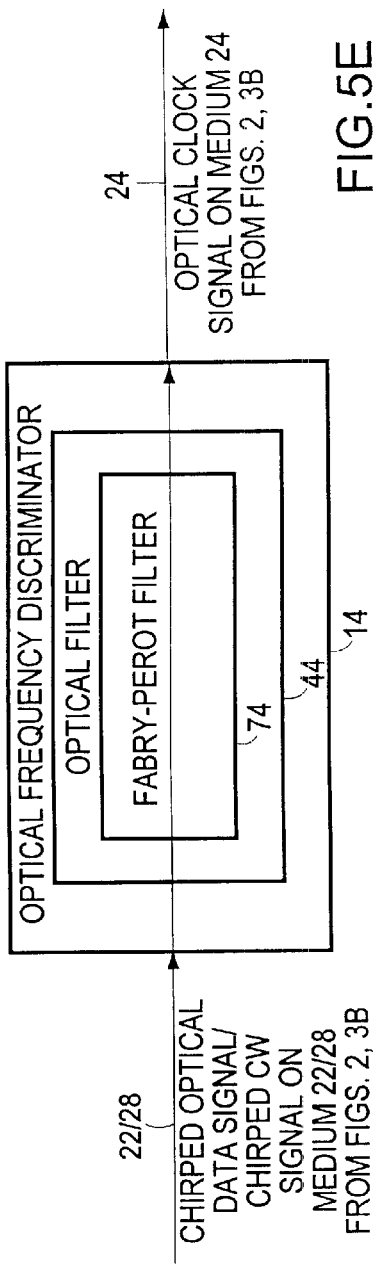
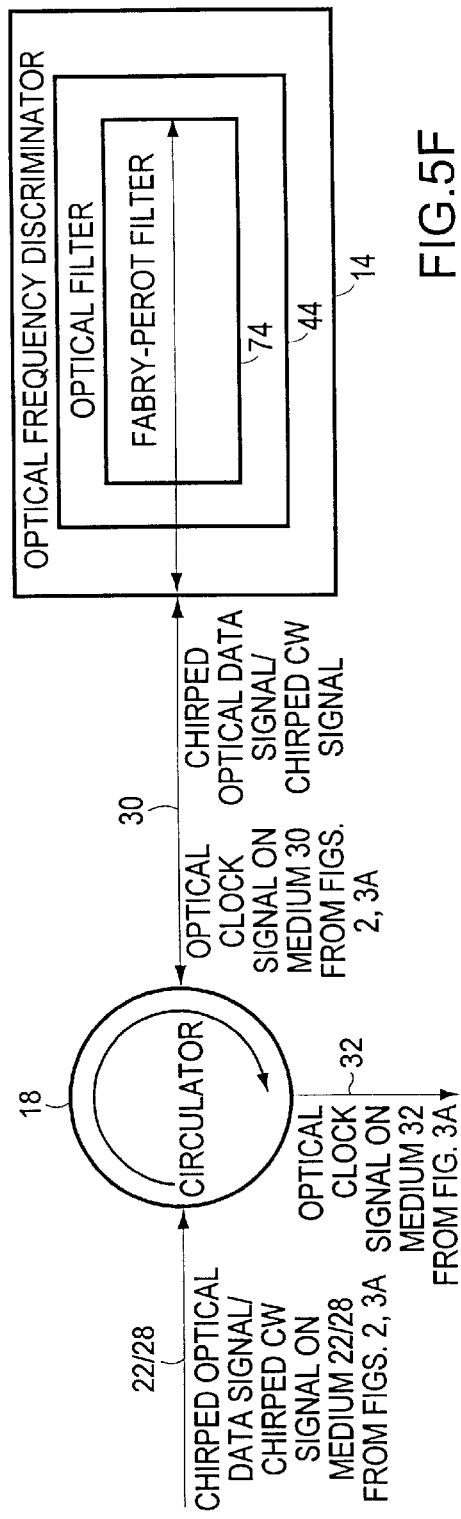

APPARATUS, SYSTEM, AND METHOD FOR EXTRACTING AN OPTICAL CLOCK SIGNAL FROM AN OPTICAL DATA SIGNAL

CROSS-REFERENCE TO RELATED APPLICATION

This nonprovisional patent application claims priority benefits under Title 35, United States Code §119(e) based upon the provisional application entitled Clock Extraction and Enhancement Using Frequency Chirping and Discrimination assigned U.S. application Ser. No. 60/186,583 filed Mar. 3, 2000 naming Weiming Mao and Guifang Li as inventors.

FIELD OF THE INVENTION

1. Background of the Invention

This invention is directed to an apparatus, system, and method for extracting and enhancing an optical clock signal from an optical data signal. The optical data signal can be a non-return-to-zero (NRZ) or a return-to-zero (RZ) signal, for example. The apparatus and methods can be applied to extract and enhance the optical clock signal to recover the optical data signal, or for other purposes.

2. Description of the Related Art

FIG. 1A is a diagram for an optical clock signal. As can be seen in FIG. 1A, the optical clock signal is in general a sinusoidal signal with a fundamental period of "T." Using the optical clock signal, a data signal can be encoded in different ways. Examples of encoding schemes are indicated in FIGS. 1B and 1C for return-to-zero (RZ) and non-return-to-zero (NRZ) signals, respectively. The RZ-formatted signal is such that it contains data pulses that return to zero in each bit period. In FIG. 1B, an exemplary byte of data "01101001" is encoded using the RZ signal format. The RZ signal has a "1" state upon the occurrence of a "1" in the data signal being encoded followed by a return to the "0" state in the later part of the period. The RZ signal remains "0" if the data bit is a "0". In contrast, as shown in FIG. 1C, the non-return-to-zero (NRZ) signal will assume a "1" state upon the occurrence of a "1" in the data to be encoded in the entire duration of the bit period, and becomes "0" upon the occurrence of a "0" in the data to be encoded.

It will be appreciated that because the RZ and NRZ signals only change their state in synchronism with the optical clock signal, the RZ and NRZ optical data signals have some inherent information regarding the timing of the clock used in their generation. Determination of the clock signal used to generate the optical data signal is generally required to recover the optical data signal. There are many schemes for extracting a clock signal from the transmitted optical data signal at a receiver. For NRZ signals, a nonlinear operation is generally required for extracting a clock component since there is not clock component present in NRZ signals. When the nonlinear operation is performed in the electronic domain, an optical-to-electrical (OE) conversion is required. Such devices for OE conversion and the required nonlinear operation are relatively complicated in construction, and correspondingly costly to develop and manufacture. Another relevant consideration is that the conversion of a signal from optical to electronic form necessarily limits data processing rates due to inherent speed limitations of electronics. For future generations of optical networks, it is believed that such conversion will become a limiting factor in network performance. Hence, it would be desirable to provide an apparatus, system, and methods useful for extraction of an optical clock signal from an optical data signal without the need to convert to an electronic signals, to avoid attendant limitations in data rates imposed by such conversion. Furthermore, it would be desirable to enhance the clock component prior to performing all-optical clock recover for both the RZ and NRZ formats.

SUMMARY OF THE INVENTION

The disclosed invention in its various embodiments overcomes the above-noted disadvantages of previous devices and techniques, and achieves significant benefits over previous technologies.

A disclosed apparatus receives an optical data signal that can include data modulated on an optical carrier signal. The optical data signal can be a return-to-zero (RZ) signal or a non-return-to-zero (NRZ) signal, for example. The apparatus comprises a non-linear optical element (NLOE) and an optical frequency discriminator (OFD). The NLOE is coupled to receive the optical data signal, and generates a chirped signal based on the optical data signal. The OFD is coupled to receive the chirped signal from the NLOE. The OFD generates an optical clock signal based on chirped frequency components of the chirped signal. The NLOE can comprise a semiconductor optical amplifier, an optical fiber, or a non-linear crystal, for example. The OFD can comprise an optical filter for passing chirped frequency components of the chirped signal, but rejecting its non-chirp frequencies. The optical filter can comprise a grating such as a fiber Bragg grating (FBG) or a planar waveguide grating, for example. Alternatively, the optical filter can be implemented as a Fabry-Perot filter (FPF). The OFD can enhance the optical amplitude of the chirped frequency components of the chirped signal to produce the optical clock signal. More specifically, the optical data signal includes at least one optical pulse whose leading and trailing portions are chirped by the NLOE. The OFD can discriminate at least one of the blue-shifted and red-shifted components of the leading and trailing edges of the optical pulse(s), respectively, to generate the optical clock signal. The OFD can also suppress the optical carrier signal relative to the chirped frequency components of the chirped signal in generating the optical clock signal.

The NLOE can operate in transmission or reflection mode. If used in reflection mode, the apparatus can comprise a circulator, for transmitting the optical data signal to the NLOE and receiving the reflected chirped signal, and for supplying such chirped signal to the OFD. Similarly, the OFD can operate in transmission or reflection mode. In the reflection mode, the apparatus can comprise a circulator coupled to receive the chirped signal from the NLOE. The circulator can be coupled to supply the optical clock signal generated by the OFD using the chirped signal, to a downstream element.

The NLOE can be undirectional or bidirectional, meaning that light travels though the NLOE in one or both directions, respectively. Unidirectional mode can be used for chirping an optical data signal with the NLOE. In either unidirectional or bidirectional operation, the NLOE can be used to mediate the optical data signal's cross-modulation of the CW signal to produce the chirped CW signal supplied as the chirped signal to the OFD. This provides the capability to extract a clock signal independently of the wavelength of the optical data signal. In the unidirectional case, the optical data signal and chirped CW signal travel in the same direction through the NLOE, and in the bidirectional case, such signals travel in opposite directions.

In one configuration, the apparatus can comprise a continuous wave (CW) source generating a CW signal. The CW source can be coupled to supply the CW signal to the NLOE. The NLOE can be an SOA or other element that mediates the optical data signal's cross-modulation of the CW signal to produce chirped frequency components in the CW signal. The resulting chirped CW signal is supplied as the chirped signal to the OFD. The OFD can discriminate chirped frequency components of the chirped CW signal to enhance the frequency components indicating the timing of the optical clock signal used to modulate data onto the optical carrier signal to produce the optical data signal.

A disclosed system receives an optical data signal. The system comprises a clock extraction apparatus having a non-linear optical element (NLOE) and an optical frequency discriminator (OFD). The NLOE is coupled to receive the optical data signal, and generates a chirped signal based on the optical data signal. The OFD is coupled to receive the chirped signal from the NLOE. The OFD generates an optical clock signal based on chirped frequency components of the chirped signal. The system also comprises a clock recovery circuit coupled to receive the optical clock signal, or a signal based thereon. The clock recovery unit generates a recovered clock signal based on the received signal. The system comprises a decision circuit coupled to receive the recovered clock signal and a signal based on the optical data signal. The decision circuit generates an electric data signal representing data extracted from the optical data signal. The recovery circuit can be electronically- or optically-based. The system can comprise one or more optical-to-electronic (O/E) converters to transform the optical data signal and the optical clock signal into electronic form for supply to the decision circuit.

A disclosed method comprises generating a chirped signal based on an optical data signal, and discriminating chirped frequency components in at least one of the leading and trailing portions of one or more pulses in the chirped signal from non-chirp frequency components of the chirped signal, to produce an optical clock signal. The optical data signal can be a return-to-zero (RZ) signal or non-return-to-zero (NRZ) signal, for example. The chirping can be performed with a non-linear optical element (NLOE). The NLOE can be a semiconductor optical amplifier (SOA), an optical fiber, or a non-linear crystal, for example. The NLOE can operate in either transmission or reflection mode, and can be unidirectional or bidirectional. The discriminating can be performed with an optical frequency discriminator (OFD). The OFD can comprise an optical filter that can be implemented as a fiber Bragg grating (FBG), a planar waveguide grating, or a Fabry-Perot filter (FPF), for example. The OFD can operate in either transmission or reflection mode. The method can comprise generating a continuous wave (CW) signal, and the chirping can be performed by using the optical data signal to cross-modulate the CW signal. The chirped CW signal can be used as the signal subjected to discrimination in the method. The chirping and discriminating can be performed so as to enhance optical amplitude of the chirped frequency components of the chirped signal to produce the optical clock signal. Furthermore, the discriminating can be performed to suppress non-chirp frequency components of the chirped signal relative to the chirped frequency components of the chirped signal in generating the optical clock signal. The non-chirped frequency components of the chirped signal can be those of the optical carrier signal or the CW signal, for example. The discriminating can be performed on at least one of the blue-shifted and red-shifted components of the leading and trailing edges of the optical pulse, respectively, to generate the optical clock signal.

These together with other features and advantages, which will become subsequently apparent, reside in the details of construction and operation of the invention as more fully hereinafter described and claimed. In the description, reference is made to the accompanying drawings, which form a part of this document, in which like numerals refer to like parts throughout the several views. The drawings are not necessarily to scale, emphasis instead being placed upon illustration of the principles of the invention.

BRIEF DESCRIPTION OF THE DRAWINGS

FIG. 1A is a timing diagram of an optical clock signal;

FIG. 1B is a timing diagram of a return-to-zero (RZ) optical data signal generated based on the optical clock signal of FIG. 1A;

FIG. 1C is a view of a timing diagram of a non-return-to-zero (NRZ) optical data signal generated based on the optical clock signal of FIG. 1A;

FIG. 2 is a block diagram of an apparatus comprising a non-linear optical element (NLOE) and an optical frequency discriminator (OFD), for extracting an optical clock signal from an optical data signal;

FIG. 5C is a cross-sectional view of a fiber Bragg grating (FBG);

FIG. 5D is a cross-sectional view of a planar waveguide grating;

FIG. 5E is a block diagram of an optical frequency discriminator comprising an optical filter with Fabry-Perot filter (FPF) operating in the transmission mode;

FIG. 5F is a block diagram of an optical frequency discriminator comprising an optical filter with Fabry-Perot filter (FPF) operating in the reflection mode;

DESCRIPTION OF THE PREFERRED EMBODIMENTS

Figure 3A:
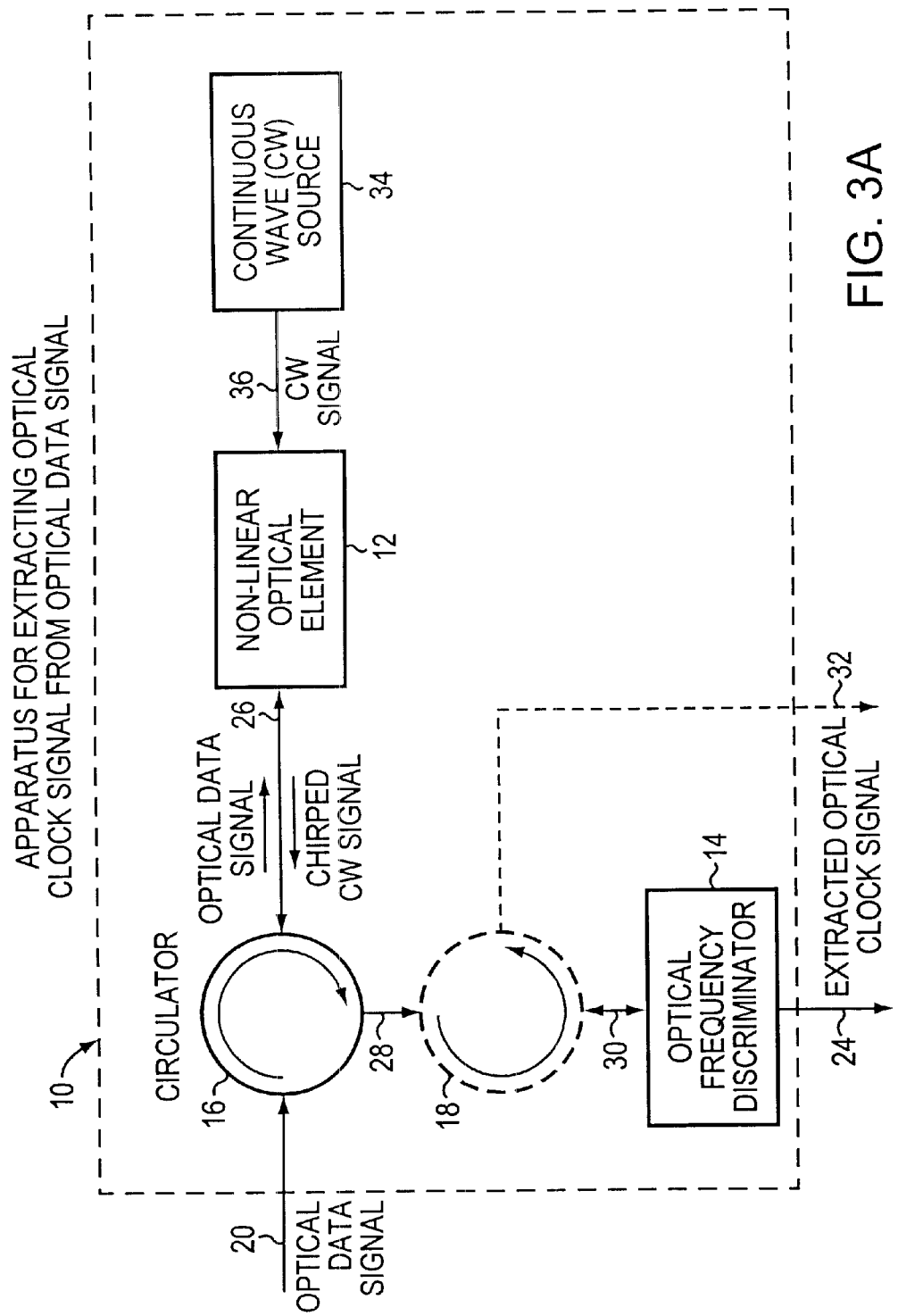
FIG. 3A is a block diagram of an apparatus comprising an NLOE, an OFD, a continuous wave (CW) source, and one or more circulators.

As used herein, the following terms have the following definitions:

"And/or" means "either or both".

"Coupled" in an optical sense means joining optical, electro-optical, or opto-electrical devices together so as to permit passing of light from one to another. Optical coupling can be done through any transmissive media, including an optical fiber, optical waveguide, air, water, space, optical oil, optical adhesive, or other media, whether directly or through intermediate device or medium. "Coupled" in an electronic sense refers to joining electronic components together with a conductive line such as a wire or cable, or by transmission of signals through air or other media, or space, for example, whether directly or through intermediate device or medium;

"Downstream" refers to a direction or element that is further along the path of travel of an optical or electric signal relative to a reference point or element along the path;

"Non-linear" refers to an optical element whose refractive index is dependent upon the intensity of light traveling therein.

"Optical medium" or "medium" is used in a very broad sense to refer to anything through which light can travel. Such light-transmissive media include discrete or integrated optical fibers or optical waveguides, air, water, space, optical oil, optical adhesive, or other media. "Optical data signal" is an optical carrier signal modulated with data.

"(s)" or "(ies)" means more than one of the preceding object. E.g., "frequency(ies)" means "one or more frequencies."

"Upstream" refers to a direction or element that is backward relative to the direction of travel of an optical or electric signal along its path of travel, relative to a reference point or element along the path.

FIG. 2 is a block diagram of a first embodiment of an apparatus 10 for extracting an optical clock signal from an optical data signal. The apparatus 10 comprises a non-linear optical element (NLOE) 12 and an optical frequency discriminator (OFD) 14. The NLOE 12 can be any element that induces a frequency chirp in an optical signal. Examples of an NLOE include a semiconductor optical amplifier (SOA) used in the amplification of an optical signal, an optical fiber or waveguide used to carry an optical signal, or an optical crystal with non-linear refractive index. These devices introduce relatively significant frequency-chirp at the leading or trailing portions of an optical pulse. Such chirp is normally considered to be non-beneficial or detrimental to the performance of an optical system. However, the disclosed apparatus 10 uses chirp in an optical signal to advantage, because such chirp is indicative of the clock signal used to modulate. the data onto an optical carrier signal to form the optical data signal. The OFD 14 discriminates the optical clock signal indicated by the frequency-chirp in the optical signal, from the non-chirp frequency components of the optical signal. More specifically, the OFD 14 enhances the chirp frequency components for use in extraction of the optical clock signal. In addition, the OFD 14 suppresses non-chirp frequency components associated with the optical carrier signal or other signal content within the optical data signal. Suppression of non-chirp frequency content permits the clock signal to be readily distinguished from other frequency components in the optical data signal.

If the NLOE 12 is transmissive, the NLOE 12 can be coupled to receive the optical data signal from an upstream element via medium 20. The NLOE 12 can be coupled to supply the chirped signal to the OFD 14 via the medium 22. On the other hand, if the NLOE 12 is reflective, circulator 16 can be coupled to receive the optical data signal from the medium 20, and coupled to supply this signal to the NLOE 12 via the medium 26. The reflected chirped signal travels from NLOE 12 via medium 26 to the circulator 16 that supplies the chirped signal to the OFD 14 via medium 28.

If the OFD 14 is transmissive, the OFD can be coupled to receive the chirped signal from the NLOE 12 via medium 26 or 28, depending upon whether the NLOE 12 is transmissive or reflective. The OFD 14 generates the optical clock signal based on the chirped signal, and supplies this to a downstream element via medium 24. On the other hand, if the OFD 14 is reflective, a circulator 18 is coupled to receive the chirped signal from the NLOE 12 on either of media 22, 28, and is coupled to supply the chirped signal to the OFD 14 via the medium 30. The OFD 14 receives the chirped signal via the medium 30, and generates the optical clock signal based on the chirped signal. The OFD 14 reflects the optical clock signal to the circulator 18 via the medium 30. The circulator 18 is coupled to supply the reflected optical clock signal to a downstream element via medium 32.

FIG. 3A is an embodiment of the apparatus 10 in which the optical data signal cross-modulates a continuous wave (CW) optical signal in the NLOE 12 in a bi-directional mode of operation. Cross-modulation of the CW signal with the optical data signal makes the operation of the apparatus 10 of FIG. 3A independent of the frequency/wavelength of the optical carrier signal on which data is modulated to form the optical data signal. In FIG. 3A, the apparatus 10 comprises the NLOE 12 and the OFD 14. In addition, the apparatus 10 comprises a circulator 16 coupled to receive the optical data signal via optical medium 20. The circulator 16 supplies the optical data signal to the NLOE 12 via the optical medium 26. The apparatus 10 includes a CW source 34 that generates the CW signal. The CW source 34 is coupled to the NLOE 12 via the optical medium 36. The NLOE 12 can be an element such as a semiconductor optical amplifier (SOA). The NLOE 12 can be provided with anti-reflective coatings at its ends so that the CW signal passes therethrough from right to left in FIG. 3A, but does not reflect in the reverse direction. Similarly, the optical data signal from the circulator 16 passes through the NLOE 12 from the left to right in FIG. 3, but not in the reverse direction. The NLOE 12 mediates the optical data signal's cross-modulation of the CW signal in the NLOE, which induces chirp on the CW signal. The chirped CW signal from the NLOE 12 passes via the optical medium 26 to the circulator 16. The circulator 16 is coupled to supply the chirped CW signal to the OFD 14 via the optical medium 28. The OFD 14 discriminates the optical clock signal from the chirped frequencies of the CW signal. The OFD 14 can be coupled to supply the optical clock signal from the OFD 14 to a downstream element via the optical medium 24 if the OFD operates in transmission mode. Alternatively, as shown in broken line in FIG. 3A, the apparatus 10 can be configured to operate in reflection mode. In this configuration, the apparatus 10 includes the circulator 18 coupled to receive the chirped CW signal from the circulator 16 via the medium 28. The circulator 18 is coupled to supply the chirped signal to the OFD 14 via the medium 30. The optical clock signal resulting from discrimination and reflection of the chirped signal by the OFD 14 travels to the circulator 18 via the medium 30. The circulator 18 can be coupled to supply the received optical clock signal to a downstream element via medium 32.

Figure 3B:
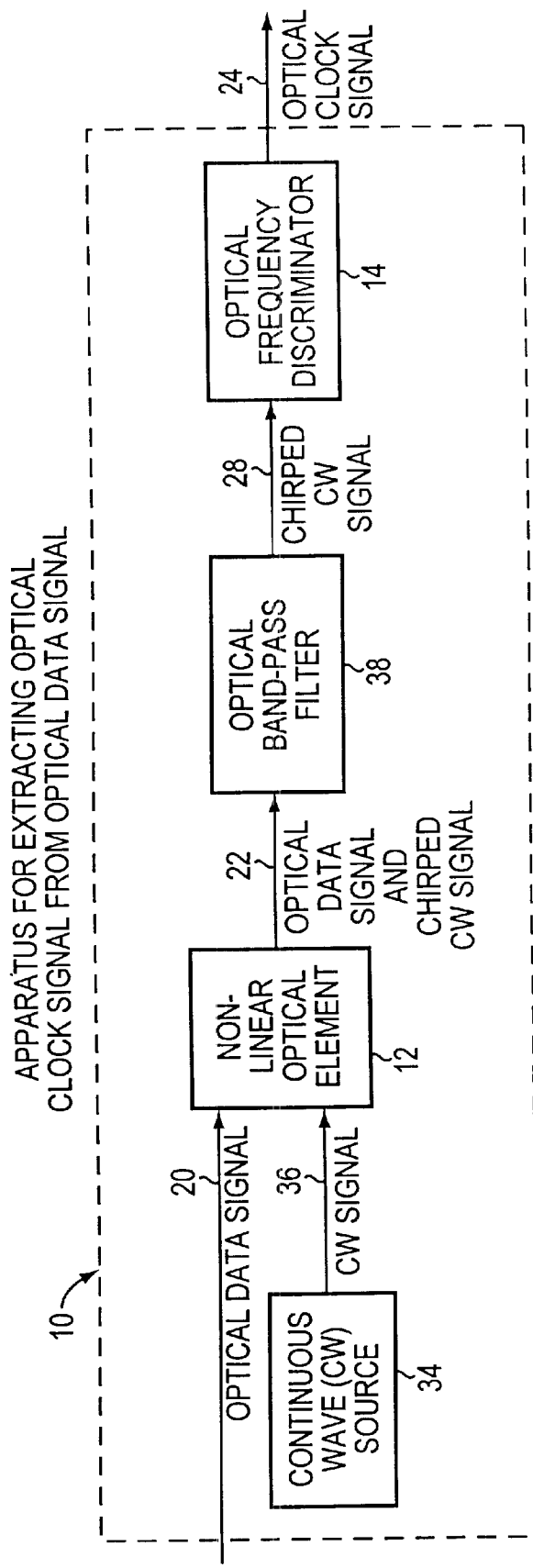
FIG. 3B is a block diagram of an alternative configuration of the apparatus comprising an NLOE, an OFD, and a CW source, and an optical band-pass filter.

FIG. 3B is an alternative configuration of the apparatus 10. In FIG. 3B, the NLOE 12 is coupled to receive the optical data signal via the medium 20, and the CW signal from the source 34 via the medium 36. The NLOE 12 mediates cross-modulation of the CW signal with the optical data signal, which produces frequency chirp on the CW signal. Unlike the configuration of FIG. 3A, however, the optical data signal and CW signal propagate in the same direction through the NLOE 12, which is thus unidirectional. The apparatus 10 of FIG. 3B comprises an optical band-pass filter 38. The filter 38 is coupled to receive the chirped CW signal and the optical data signal via the medium 22. The optical band-pass filter 38 rejects frequencies of the optical data signal, but permits those of the chirped CW signal to pass therethrough. The OFD 14 is coupled to receive the chirped CW signal via the medium 28, and generates the optical clock signal based thereon. The OFD 14 outputs the optical clock signal on medium 24.

Figure 4A:
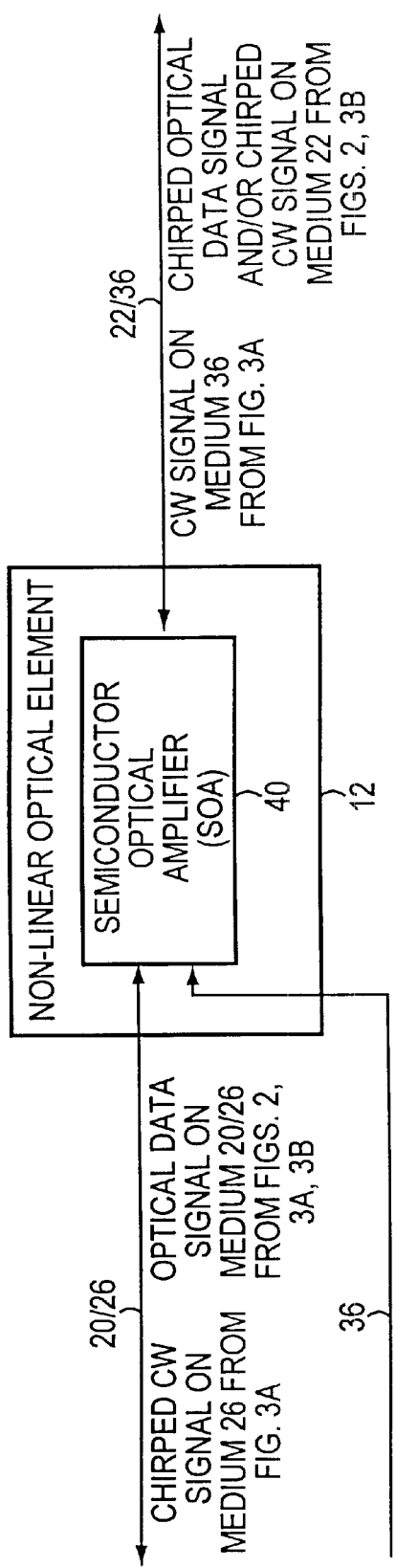
FIG. 4A is an NLOE comprising a semiconductor optical amplifier (SOA)

FIG. 4A is a view of the NLOE 12 implemented as a semiconductor optical amplifier (SOA) 40. The SOA 40 can be a device such as the model no. M1002 commercially-available from Alcatel® Corporation, and other SOA devices from GenOA, Inc., Fremont, Calif. For example, the SOA 40 can be implemented with an active region length of 800 microns, width of 1.2 microns, and thickness of 0.2 microns.

Figure 4B:
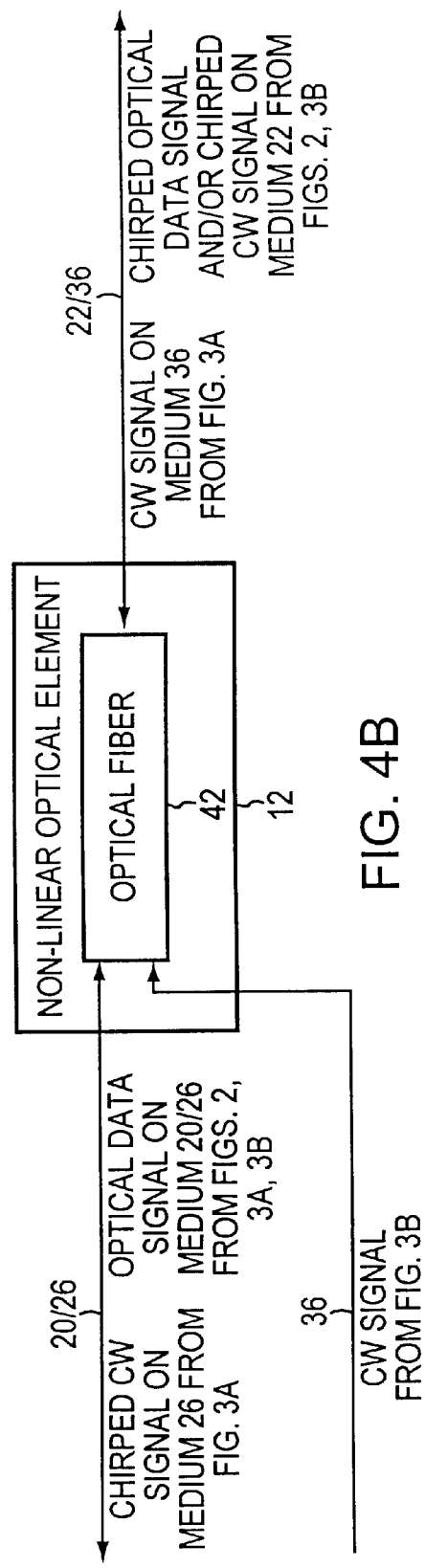
FIG. 4B is an NLOE comprising an optical fiber.

FIG. 4B is a view of the NLOE 12 implemented as an optical fiber 42. The fact that an optical fiber generates chirp has not heretofore been considered beneficial. However, the NLOE 12 can use this feature of the optical fiber 42 to generate chirp in an optical data signal for extraction of an optical clock signal reflecting the timing at which data has been modulated onto an optical carrier to produce the optical data signal. The optical fiber can be operated in transmissive mode by leaving its ends transmissive. The optical fiber can be operated in reflection mode by forming a reflective coating at the one end of the optical fiber opposite that receiving the optical data signal. The optical data signal travels into the optical fiber, is subjected to the non-linearities of the optical fiber, and reflects from the reflective end of the optical fiber, and is transmitted from the end of the optical fiber that received the optical data signal.

Figure 4C:
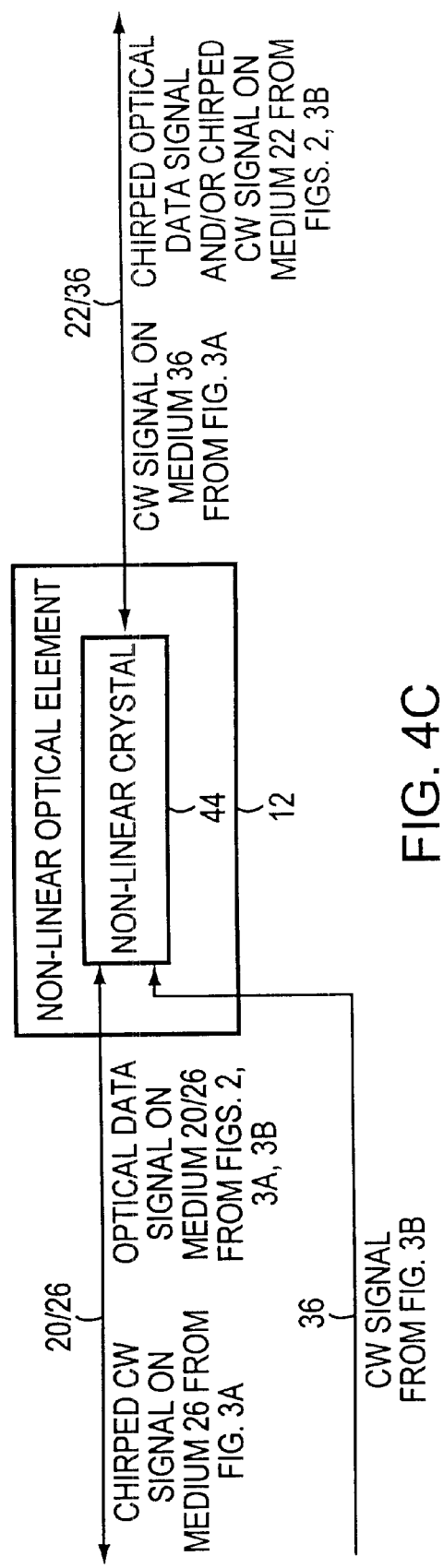
FIG. 4C is an NLOE comprising a non-linear crystal.

FIG. 4C is yet another alternative implementation of the NLOE 12. In this implementation, the NLOE 12 comprises a crystal 44 that is non-linear, i.e., whose refractive index depends upon the intensity of the optical data signal or CW signal. For example, the non-linear crystal can be gallium arsenide (GaAs) or lithium niobate (LiNbO$_3$). The non-linear crystal 44 can be operated in transmission mode in which case the optical data signal or CW signal passes through the crystal 44 in one direction and is subjected to chirp to produce the chirped signal. If the NLOE 12 operates in reflection mode, a reflective surface can also be provided on the crystal 44 so that the optical data signal travels through the crystal in one direction, and is reflected from the reflective end of the crystal to travel in the opposite direction. The optical data signal is thus subjected to chirping by the non-linear crystal 44 along both directions of travel therein to produce the chirped signal.

Turning now to FIGS. 5A–5F, the OFD 14 is described in further detail. The OFD 14 is designed to pass the chirped frequency components of the optical data signal or CW signal. Because these chirped components are indicative of the timing of the clock signal used to modulate data onto an optical carrier in generation of the optical data signal, enhancement of these components by the OFD 14 is beneficial to recovering the clock signal. The OFD 14 can also reject or suppress frequency components at the carrier signal included within the optical data signal (FIG. 2), or frequency components of the CW signal (FIGS. 3A and 3B). Such suppression generally increases the amplitude of clock frequency components in the chirped optical data signal or CW signal, as compared to the frequencies of the carrier signal or CW signal. Due to its insertion loss, the OFD 14 will attenuate chirp frequency components to a degree. It is generally important to consider the insertion loss of the OFD 14 so that its beneficial effects in terms of enhancement of the clock frequency components and suppression of non-clock frequency components, is not negated by the insertion loss of the OFD 14. In general, the OFD 14 should be formed or selected so that:

(1) the OFD 14 enhances chirped frequency components indicative of the clock signal;
(2) the OFD 14 suppresses non-chirp frequency components in the optical data signal or CW signal; and
(3) the OFD 14 does not cause more insertion loss than clock enhancement.

Satisfaction of these criteria generally provides a highly-effective OFD. At present, the frequencies of the optical carrier signals or CW signals are generally at approximately 191 Terahertz. In contrast, the chirped frequency components of an optical data signal are generally ten (10) to forty (40) Gigahertz. Therefore, OFD 14 should be designed to reject the carrier and allow the chirp components to pass based on the above-indicated frequency ranges. This is of course not intended to exclude the use of the apparatus 10 with other carrier frequencies that are now in use, or may come to be used in the future.

As shown in FIGS. 5A–5F, the OFD 14 can be implemented as an optical filter 46. The optical filter 46 can be implemented as a grating 48. Exemplary parameters for the grating 48 include a bandwidth of ten (10) to forty (40) GHz, 95–100% transmissivity, insertion loss less than 3 decibels (dB), grating length ranging from one millimeter (1 mm) to ten centimeters (10 cm), and an index difference between regions defining repetitive units of the grating ranging from $10^{-1}$ to $10^{-6}$, for example. Such gratings are commercially-available from numerous sources including Bragg Photonics, Inc., Dorval, Quebec, Canada and 3M Corporation, St. Paul, Minn., USA, for example.

Figure 5A:
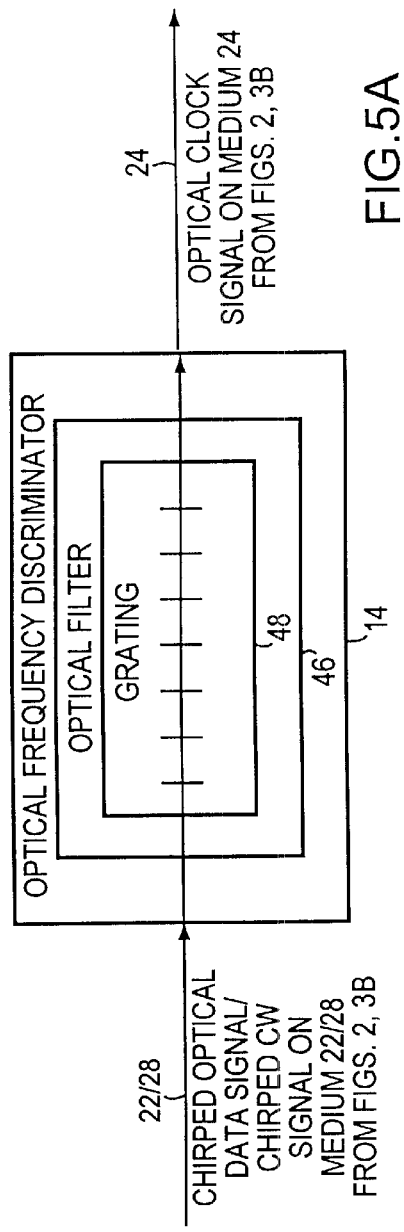
FIG. 5A is a block diagram of an optical frequency discriminator comprising an optical filter with grating operating in the transmission mode.
Figure 5B:
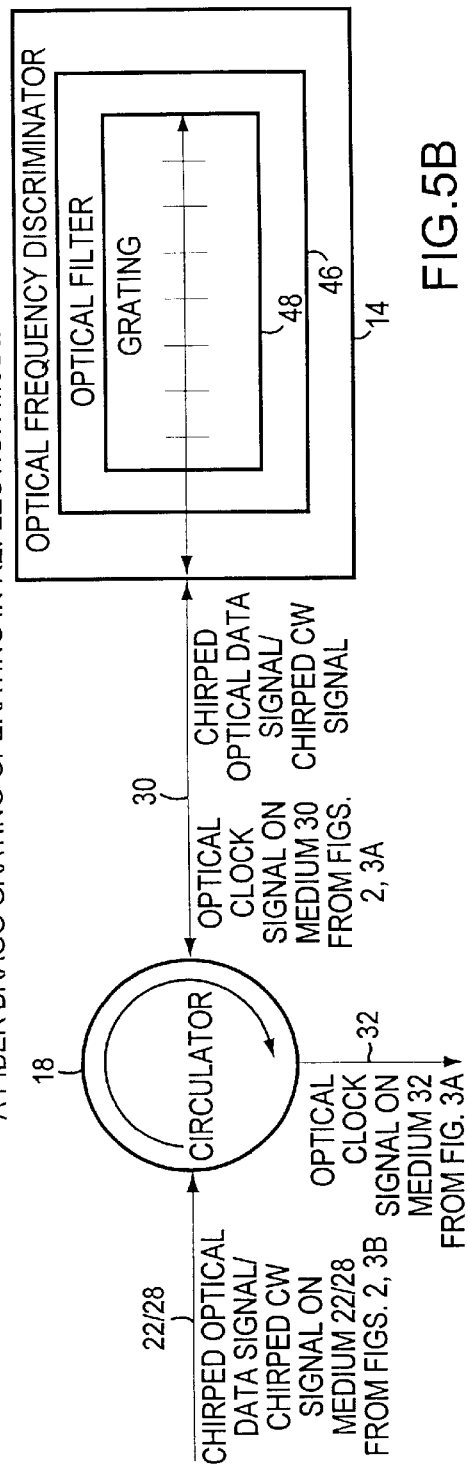
FIG. 5B is a block diagram of an optical frequency discriminator comprising an optical filter with grating operating in the reflection mode.

The OFD 14 of FIG. 5B is similar in most respects to that of FIG. 5A. The primary difference between the two configurations is that the OFD 14 of FIG. 5B operates in reflection rather than transmission. Hence the chirped frequency components of the OFD 14 reflect from rather than transmit through, the OFD 14 of FIG. 5B. The OFD 14 can comprise the optical filter 46, optionally implemented as the grating 48. In this case, the grating 48 can have a reflectivity of 95–100%, for example.

As shown in FIG. 5C, the grating 48 of FIGS. 5A or 5B can be implemented as an FBG formed from an optical fiber having a cladding 50 surrounding core 52. The core 52 has a higher refractive index than the core, or vice versa. The core 52 defines repetitive units 54 composed of alternating regions 56, 58 with different refractive indices. The optical fiber thus has a periodic variation in its refractive index along its longitudinal core axis. Such variation in refractive index can be accomplished through variation in concentration of dopants applied to the optical fiber's core along the direction of propagation of light therein. Alternatively, the materials, and thereby optical properties, composing the optical fiber can be varied along its length. In an alternative implementation, dopants or chemicals are added and diffused into the core of the optical fiber and exposed to patterned light at a selective wavelength such as ultra-violet (UV) light. The light can be patterned with a mask defining the repetitive units, for example. Due to the presence of the additive or chemical, the portions of the optical fiber that are exposed to the patterned light change refractive index to form the FBG 48. As is well-known, the FBG 48 can include tens to several thousand repetitive units along its length. If operated in reflection mode, the FBG can comprise a reflective surface 60 composed of silicon dioxide ($SiO_2$) or other reflective film. If operated in transmission mode, reflective film 60 is not necessary.

FIG. 5D is a view of a planar waveguide grating that can be used as the grating 48 of FIGS. 5A or 5B. The planar waveguide grating generally comprises layers 62, 64 composed of materials having different refractive indexes. For example, layers 62, 64 can be implemented as silicon dioxide ($SiO_2$) layers with different concentrations of dopants such as magnesium (Mg), boron (B), or phosphorus (P), for example. The layers 62, 64 are surrounded by light confinement layers 68, 66 composed of materials such as silicon dioxide ($SiO_2$) with a lower refractive index than that of layers 62, 64. As their name would imply, the light confinement layers 66, 68 confine light within layers 62, 64. The layers 62, 64 define repetitive units 70, of which there can be tens to thousands. If operated in reflection mode, the grating 48 of FIG. 5D can comprise reflective end surface 72 to reflect light incident thereto. The end surface 72 can be implemented as a film of silicon dioxide ($SiO_2$), generally from one to several microns or more in thickness, with a refractive index sufficiently different from that of layers 62, 64 to cause reflection of light at the end of the grating.

FIG. 5E is a view of a transmission-mode OFD 14 comprising the optical filter 38 implemented as a Fabry-Perot filter (FPF) 48. The FBF 48 is generally an optically-transmissive material with a refractive index that is different from the external medium in which the FBF is situated, generally air, a vacuum, or a controlled environment containing an inert gas such as helium or nitrogen, for example. The optical length of the FBF 48 is defined to reject frequencies of the optical carrier signal or CW signal, and to pass the chirp frequencies of such signals. The FBF 48 of FIG. 5E can be partially-reflective at its ends to allow the optical data signal or CW signal to travel through such ends, as well as to generate reflections of the optical data signal or CW signal inside of the device to produce wavelength selectivity that enhances chirp frequencies to produce the optical clock signal.

FIG. 5F is a view of a reflection-mode OFD 14 implemented with an FBF 74. The FBF 74 is similar to that described in FIG. 5E with the exception that its end opposite that at which the chirped signal is introduced into the FBF is generally 95–100% reflective so that as much of the chirped signal as possible reflects from this end of the FBF. Hence the optical data signal travels into the transmissive end of the FBF 74, travels the length of the FBF, reflects from its reflective end, and travels back through the FBF to and through the transmissive end. The optical data signal is chirped along its path of travel in the FBF so that the optical data signal becomes a chirped signal upon exiting the FBF's transmissive end.

Figure 6A:
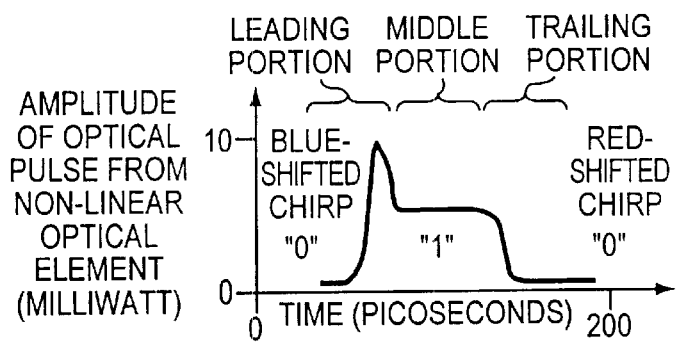
FIG. 6A is a graph of amplitude of an optical pulse from an NLOE versus time for a chirped optical data or continuous wave (CW) signal.
Figure 6B:
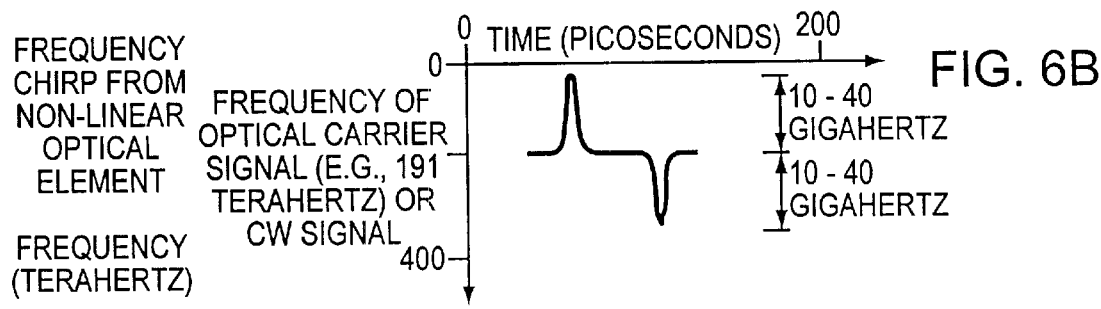
FIG. 6B is a graph of frequency chirp from an NLOE versus time.

The principle of operation of the clock extraction and enhancement apparatus is shown in detail in FIGS. 6A–6D in which an SOA is used as the NLOE for exemplary purposes. FIG. 6A shows the amplitude of an optical pulse versus time when it passes through the SOA. Due to gain saturation of the SOA, an overshoot is observed at the leading edge of the pulse. When an optical data stream having many optical pulses pass through the SOA, each pulse will have an overshoot at its leading edge. Those overshoots will provide a clock component. In the non-return-to-zero (NRZ) case, for example, the RF spectrum of a 5 Gb/s NRZ data stream is shown in FIG. 7A, which is void of the 5 GHz clock component. The RF spectrum of the same NRZ data. stream after passing through the SOA is shown in FIG. 7B, which contains a −31 dBm clock component at 5 GHz. The presence of this clock component is entirely due to the existence of the overshoots. The overshoot behavior has been previously exploited for the purpose of clock extraction. Unlike previous devices, the current invention exploits chirping characteristics of the NLOE. Accompanying overshoots due to gain saturation, the optical carrier experiences frequency chirping. More specifically, the SOA chirps the optical pulse so that frequencies in the leading portion of the pulse are blue-shifted toward higher frequencies. In the frequency domain, the trailing edge of the pulse also experience chirping due to gain recovery. Specifically, the trailing portion of the pulse are red-shifted toward lower frequencies. The middle portion of the pulse is blue-shifted in an insignificant amount relative to the leading portion of the pulse. The chirping characteristics are shown in FIG. 6B. Similar frequency chirping characteristics to those described above can also be induced in any nonlinear optical element (NLOE). Essentially, when the index of refraction of the media in which the light is propagating depends on the light intensity, the phase of the light is modulated by its own intensity (known as self phase modulation), and thus the frequency of the light is chirped. The chirping characteristics as shown in FIG. 6B also apply to return-to-zero data streams.

Frequency chirping can also be mediated by 'cross phase modulation' in which the presence of another light signal typically at a different wavelength induces an index change, shown in FIGS. 3A or 3B. As a result, frequency chirping due to cross phase modulation is a reflection of the intensity characteristics of the other light signal causing cross phase modulation. Therefore, FIG. 6B is representative of frequency chirp of the CW signal due to cross phase modulation from the NLOE 12.

Figure 6C:
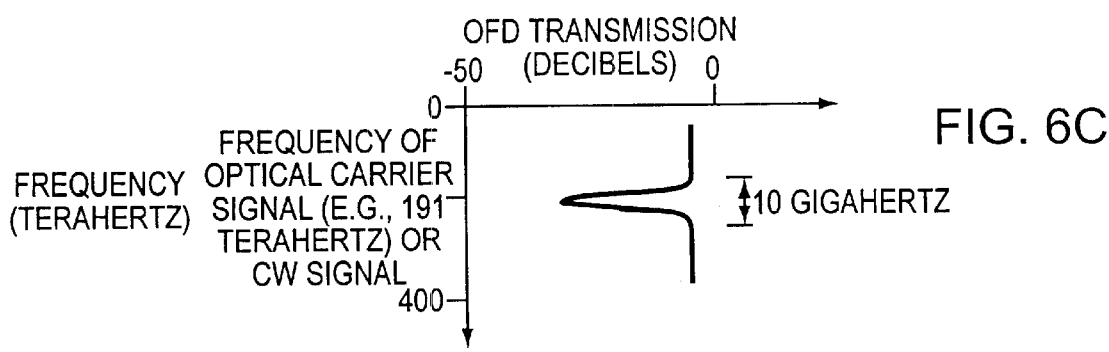
FIG. 6C is a graph of OFD transmission versus frequency.
Figure 7A:
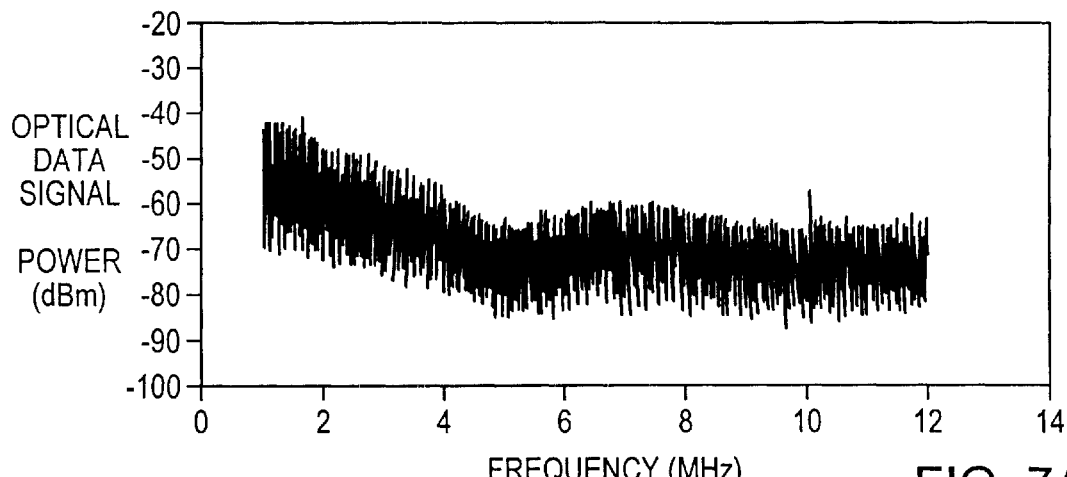
FIG. 7A is a graph of an exemplary RF spectrum (RF power spectral density versus frequency) of an optical data signal.
Figure 7B:
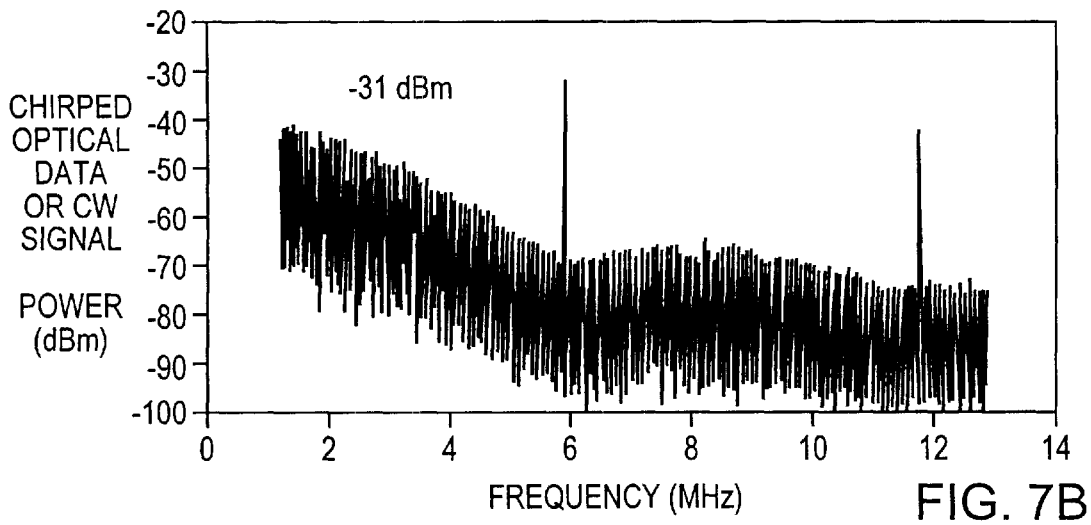
FIG. 7B is a graph of an exemplary RF spectrum for a chirped optical data signal.

FIG. 6C is a graph of filter transmission versus frequency for the OFD 14. The filter transmits chirped frequencies, but rejects frequencies of the optical carrier signal associated with the optical data signal of FIG. 2 or the CW signal of FIGS. 3A or 3B.

Figure 6D:
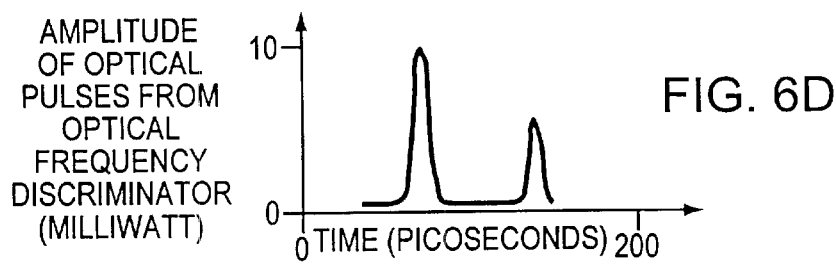
FIG. 6D is a graph of amplitude of optical pulses from an OFD versus time.
Figure 7C:
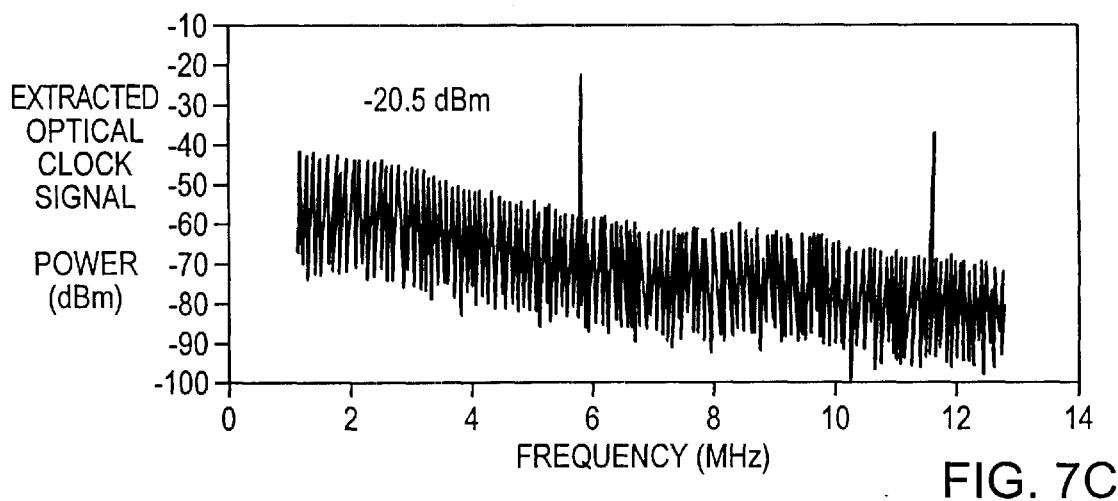
FIG. 7C is a graph of an exemplary RF spectrum for an extracted optical data signal.

FIG. 6D is a graph of the amplitude of optical pulses in the optical clock signal from the OFD 14. FIG. 6D represents the application of the transmission spectra of the OFD 14 as shown in FIG. 6C, to the time-varying frequency chirp of FIG. 6B. The OFD 14 thus passes the chirp frequencies and rejects the optical data signal or CW signal. Accordingly, the OFD 14 generates two pulses, one relatively high in amplitude corresponding to the leading portion of the pulse, and a second relatively low amplitude pulse corresponding to the trailing portion of the optical pulse. In an RZ signal, these two pulses reveal the duty cycle of the optical data signal, and if more than one pulse occurs in succession, the frequency of the RZ signal can be readily determined. More specifically, the minimal time between successive pulses of the leading or trailing portions of the pulse reveals the period of the clock signal used to modulate data on the carrier of the optical data signal. In an NRZ signal, the occurrence of two adjacent transitions from "0" to "1" and "1" to "0", or vice versa, produces two pulses corresponding to the leading and trailing portions of the optical data signal. The difference in minimal time between the occurrence of the two pulses reveals the period of the clock signal used to modulate the data in the optical data signal. In additional to extracting the clock signal, the current invention also enhances the clock signal. When the chirped signal with its RF spectrum shown in FIG. 7B is passed through the OFD, the resultant clock component is enhanced by 10.5 dB to −20.5 dBm. This enhancement is because the OFD converts frequency chirp to amplitude variations. Furthermore, the OFD significantly reduce the optical carrier energy containing time-varying data signal. The spectrum of the data is contained in the frequency ranges from DC to below the clock frequency. As FIG. 7C also shows, non-chirp frequency components have been suppressed to further distinguish the optical clock signal from non-chirp frequencies.

It should be appreciated that the OFD 14 should be designed so as to discriminate the optical carrier signal or CW signal from at least one different frequency within the chirped frequencies produced by the NLOE. Therefore the center frequency of the OFD should be the same as the optical signal in the case of self phase modulation or the CW signal in the case of cross phase modulation. In wavelength division multiplexed (WDM) systems, the optical carrier frequency is different for each WDM channel. When the NLOE is operating in the self phase modulation mode, the frequency chirped is above and below the optical carrier frequency. The center frequency of the OFD in this case has to be designed to be the same as the optical carrier frequency. In the case of cross phase modulation, however, one can chose the center frequency of the OFD and the frequency of the CW signal to be the same, possibly different from the optical carrier frequencies of all the WDM channels. In so doing, the cross-phase modulation configuration become insensitive to the optical carrier frequency (wavelength insensitive).

Figure 8:
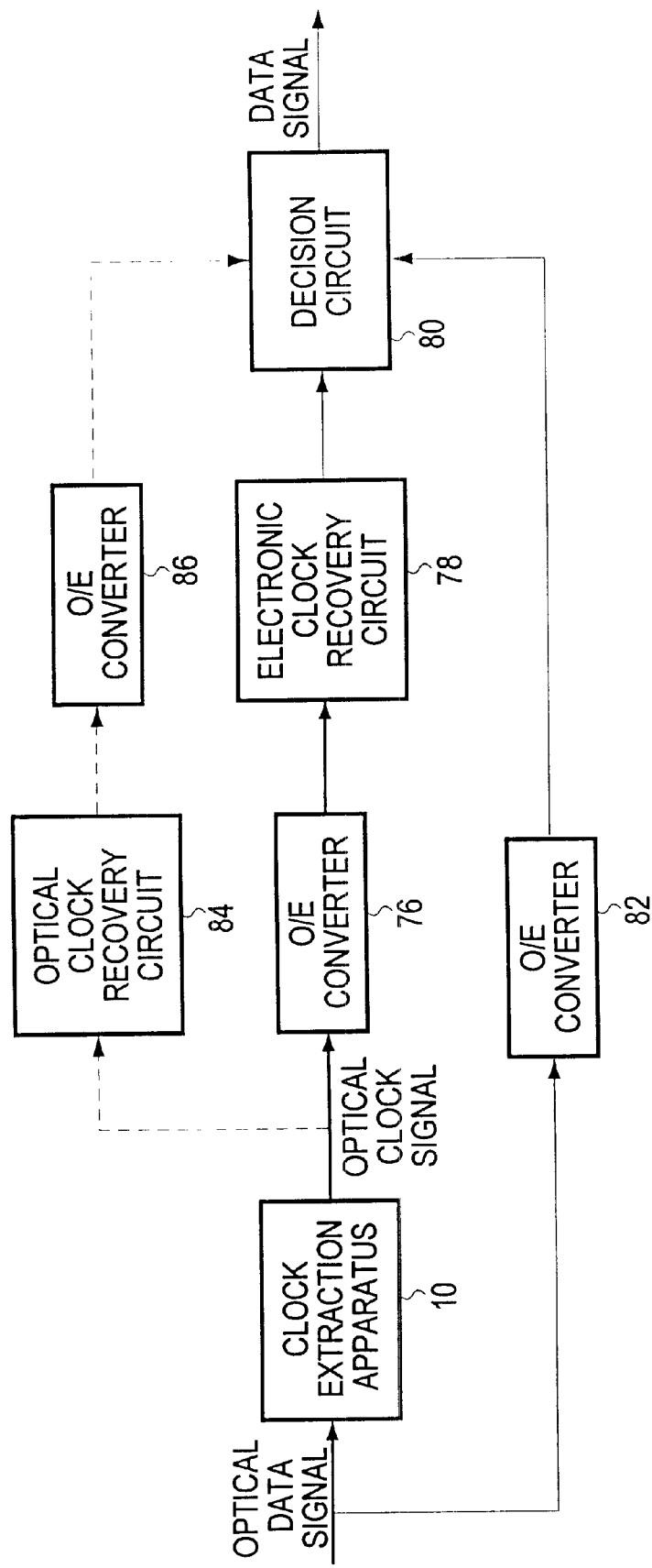
FIG. 8 is a block diagram of a system including the apparatus for extracting the optical clock signal from the optical data signal.

FIG. 8 is a block diagram of a system using the clock extraction apparatus 10. In addition to the clock extraction apparatus 10, the system of FIG. 8 comprises an optical-to-electrical (O/E) converter 76, an electronic clock recovery circuit 78, a decision circuit 80, and an O/E converter 82. The clock extraction apparatus 10 is coupled to receive the optical data signal from an upstream component such as a transmitter, repeater, router, switch, hub, and/or optical fiber, for example. The apparatus 10 extracts the optical clock signal and is coupled to supply such signal to the O/E converter 76. The O/E converter 76 transforms the optical clock signal into an electrical clock signal. The O/E converter 76 is coupled to supply the electric clock signal to the electronic clock recovery circuit 78. The recovery circuit 78 has amplification and filtering circuits to further condition and enhance the electric clock signal. The electronic clock recovery circuit 78 is coupled to supply its enhanced clock signal to the decision circuit 80. The O/E converter 82 is coupled to receive the optical data signal, and converts this signal into an electric signal. The O/E converter 82 is coupled to supply the O/E-converted electronic data signal to the decision circuit 80. The decision circuit 80 includes logic gates to generate an electric data signal based on the data signal from the O/E converter 82 and the clock signal from the recovery circuit 78. The decision circuit 80 effectively uses the clock signal to extract data from the optical data signal. The decision circuit 80 can be coupled to supply the data signal to a downstream element(s) such as a computer or a RF transceiver, for example.

Instead of the O/E converter 77 and the electronic clock recovery circuit 78, it is possible to use optical clock recovery circuit 84 and O/E converter 86 to recover the clock signal and convert it into electronic form. More specifically, the optical clock recovery unit 84 is coupled to receive the optical clock signal from the clock extraction apparatus 10. The recovery circuit 84 contains amplification and filtering circuits to enhance and stabilize the optical clock signal. The recovery circuit 84 is coupled to supply its recovered optical clock signal to the O/E converter 86 that transforms the received signal into an electric clock signal. The O/E converter 86 is coupled to supply its electric clock signal to the decision circuit 80 that uses such signal and the electric data signal from the O/E converter 82 to generate the data signal in electric form.

Figure 9:
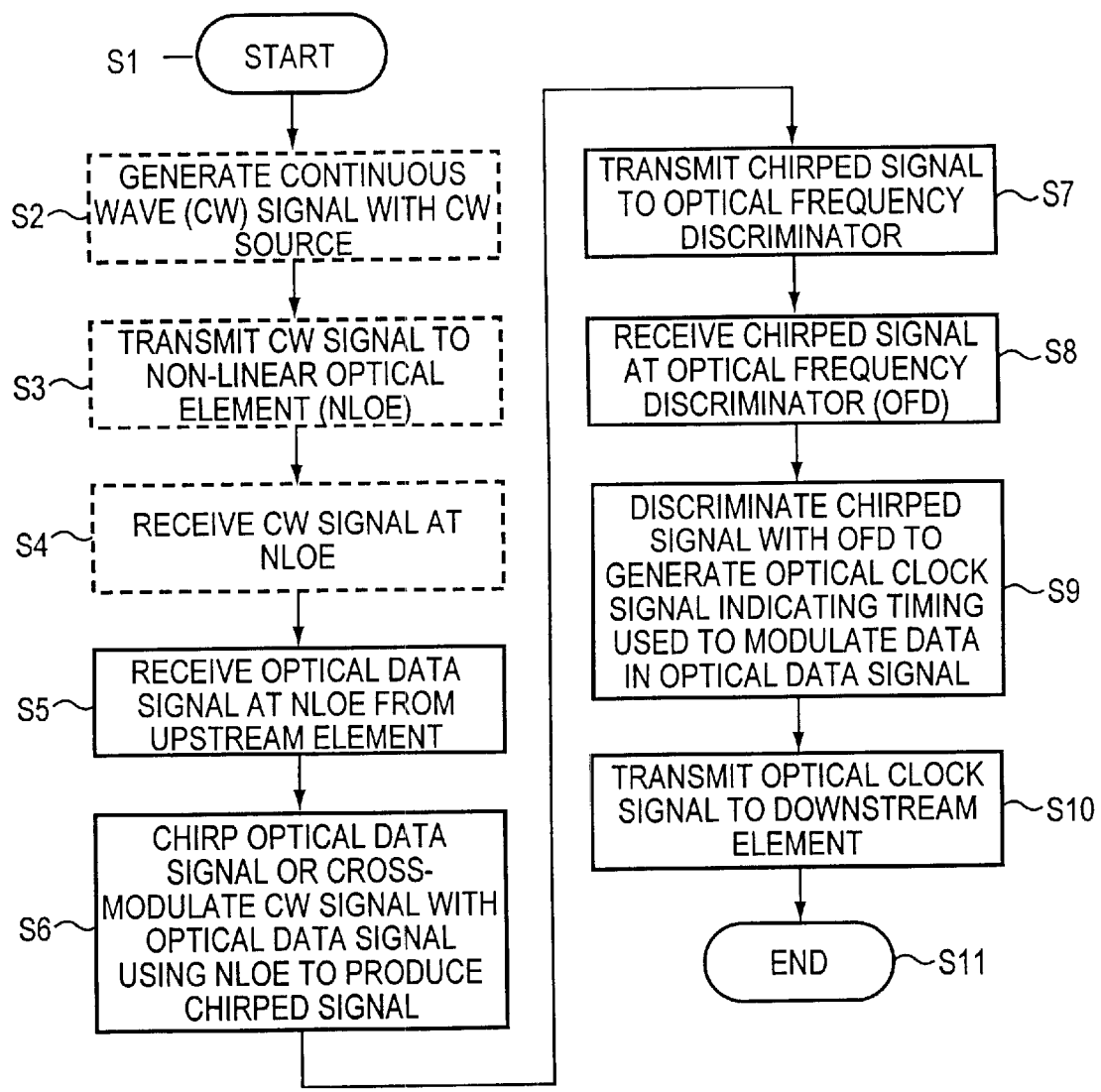
FIG. 9 is a method of operation of the clock extraction apparatus.

FIG. 9 is a method of operation of the clock extraction apparatus 10. In step S1 the method of FIG. 9 begins. Steps S2–S4 apply to the apparatus embodiment of FIG. 3. Steps S5–S11 apply to both the embodiments of FIGS. 2 and 3. In step S2 the apparatus 10 generates a continuous wave (CW) signal with CW source 34. In step S3 the CW source 34 transmits the CW signal to the NLOE 12. In step S4 the NLOE 12 receives the CW signal. In step S5 the clock extraction apparatus 10 receives the optical data signal (see FIGS. 2, 3A, 3B) and optionally also the CW signal (see FIGS. 3A, 3B) at the NLOE 12. In step S6 the NLOE 12 uses the received signal(s) to generate a chirped signal. In step S7 the NLOE 12 transmits the chirped signal to the OFD 14. In step S8 the OFD 14 receives the chirped signal at the OFD 14. In step S9 the OFD 14 discriminates the chirped signal to generate an optical clock signal indicating the timing used to modulate data contained in the optical data signal. In step S10 the OFD 14 transmits the optical clock signal extracted from the chirped signal to a downstream element. In step S11 the method of FIG. 9 ends.

The many features and advantages of the present invention are apparent from the detailed specification and thus, it is intended by the appended claims to cover all such features and advantages of the described apparatus, system, and method which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

What is claimed is:

1. An apparatus receiving an optical data signal, the apparatus comprising:
a non-linear optical element (NLOE) coupled to receive the optical data signal, the NLOE generating a chirped signal based on the optical data signal; and
an optical frequency discriminator (OFD) coupled to receive the chirped signal from the NLOE, the OFD generating an optical clock signal based on chirped frequency components of the chirped signal.

2. An apparatus as claimed in claim 1 wherein the optical data signal is a return-to-zero (RZ) signal.

3. An apparatus as claimed in claim 1 wherein the optical data signal is a non-return-to-zero (NRZ) signal.

4. An apparatus as claimed in claim 1 wherein the NLOE operates in transmission mode.

5. An apparatus as claimed in claim 1 wherein the NLOE operations in reflection mode.

6. An apparatus as claimed in claim 5 further comprising:
a circulator coupled to receive the chirped signal reflected from the NLOE, the circulator coupled to supply the chirped signal to the OFD.

7. An apparatus as claimed in claim 1 wherein the OFD operates in transmission mode.

8. An apparatus as claimed in claim 1 wherein the OFD operates in reflection mode.

9. An apparatus as claimed in claim 1 further comprising:
a circulator coupled to receive the optical clock signal reflected from the OFD, wherein the OFD is coupled to supply the optical clock signal to a downstream element.

10. An apparatus as claimed in claim 1 further comprising:
a continuous wave (CW) source generating a CW signal, the CW source coupled to supply the CW signal to the NLOE, the optical data signal cross-phase modulating the CW signal in the NLOE to produce the chirped CW signal supplied to the OFD.

11. An apparatus as claimed in claim 10 wherein the NLOE is bidirectional so that the optical data signal and CW signal travel in opposite directions through the NLOE.

12. An apparatus as claimed in claim 10 wherein the NLOE is unidirectional so that the optical data signal and CW signal travel in the same direction through the NLOE.

13. An apparatus as claimed in claim 10 wherein the optical data signal is supplied to the apparatus by an upstream element, the apparatus further comprising:
a circulator coupled to receive the optical data signal from the upstream element, coupled to supply the optical data signal to the NLOE, coupled to receive the chirped signal from the NLOE, and coupled to supply the chirped signal to the OFD.

14. An apparatus as claimed in claim 10 wherein the NLOE comprises a semiconductor optical amplifier (SOA).

15. An apparatus as claimed in claim 1 wherein the NLOE comprises a semiconductor optical amplifier (SOA).

16. An apparatus as claimed in claim 1 wherein the NLOE comprises an optical fiber.

17. An apparatus as claimed in claim 1 wherein the NLOE comprises a non-linear crystal.

18. An apparatus as claimed in claim 1 wherein the OFD enhances the optical amplitude of the chirped frequency components of the chirped signal to produce the optical clock signal.

19. An apparatus as claimed in claim 1 wherein optical data signal includes an optical carrier signal, and the OFD suppresses the optical carrier signal relative to the chirped frequency components of the chirped signal in generating the optical clock signal.

20. An apparatus as claimed in claim 1 wherein the chirped signal includes a chirped CW signal, and the OFD suppresses the CW signal relative to the chirped frequency components of the chirped signal in generating the optical clock signal.

21. An apparatus as claimed in claim 1 wherein the OFD comprises an optical filter.

22. An apparatus as claimed in claim 1 wherein the OFD comprises a grating.

23. An apparatus as claimed in claim 22 wherein the grating comprises a fiber Bragg grating (FBG).

24. An apparatus as claimed in claim 22 wherein the grating comprises a planar waveguide grating.

25. An apparatus as claimed in claim 1 wherein the OFD comprises a Fabry-Perot filter (FPF).

26. An apparatus as claimed in claim 1 wherein the optical data signal includes at least one optical pulse whose leading and trailing portions are chirped by the NLOE, the OFD discriminating at least one of the blue-shifted and red-shifted components of the leading and trailing portions of the optical pulse, respectively, to generate the optical clock signal.

27. A system receiving an optical data signal, the system comprising:
a clock extraction apparatus having:
a non-linear optical element (NLOE) coupled to receive the optical data signal, the NLOE generating a chirped signal based on the optical data signal; and
an optical frequency discriminator (OFD) coupled to receive the chirped signal from the NLOE, the OFD generating an optical clock signal based on chirped frequency components of the chirped signal;
a clock recovery circuit coupled to receive a signal based on the optical clock signal, and generating a recovered clock signal based on the received signal; and
a decision circuit coupled to receive the recovered clock signal and the a signal based on the optical data signal, to generate an electric data signal representing data extracted from the optical data signal.

28. A system as claimed in claim 27 wherein the clock recovery circuit is electronic, the system further comprising:
an optical-to-electrical (O/E) converter coupled to receive the optical clock signal, and generating an electric clock signal based on the optical clock signal.

29. A system as claimed in claim 27 wherein the clock recovery circuit is optical, the system further comprising:
an optical-to-electrical (O/E) converter coupled to receive the recovered clock signal, and generating an electric clock signal based on the optical clock signal, the O/E converter coupled to supply the electric clock signal to the decision circuit.

30. A system as claimed 27 further comprising:
an optical-to-electrical (O/E) converter coupled to receive the optical data signal, and generating an O/E-converted data signal based on the optical data signal, the O/E converter coupled to supply the O/E-converted data signal to the decision circuit as the signal based on the optical data signal.

31. A method comprising the steps of:
a) generating a chirped signal based on an optical data signal; and
b) discriminating chirped frequency components for at least one of the leading and trailing portions of at least one pulse in the chirped signal from non-chirp frequency components of the chirped signal, to produce an optical clock signal.

32. A method as claimed in claim 31 wherein the optical data signal is a return-to-zero (RZ) signal.

33. A method as claimed in claim 31 wherein the optical data signal is a non-return-to-zero (NRZ) signal.

34. A method as claimed in claim 31 wherein step (a) is performed with a non-linear optical element (NLOE).

35. A method as claimed in claim 34 wherein the NLOE operates in transmission mode in the performance of the step (a).

36. A method as claimed in claim 34 wherein the NLOE operations in reflection mode in the performance of the step (a).

37. A method as claimed in claim 34 wherein the NLOE is unidirectional.

38. A method as claimed in claim 34 wherein the NLOE is bidirectional.

39. A method as claimed in claim 34 wherein the NLOE comprises a semiconductor optical amplifier (SOA).

40. A method as claimed in claim 34 wherein the NLOE comprises an optical fiber.

41. A method as claimed in claim 34 wherein the NLOE comprises a non-linear crystal.

42. A method as claimed in claim 31 wherein step (b) is performed with an optical frequency discriminator (OFD).

43. A method as claimed in claim 42 wherein the OFD operates in transmission mode.

44. A method as claimed in claim 42 wherein the OFD operates in reflection mode.

45. A method as claimed in claim 42 wherein the OFD comprises an optical filter.

46. A method as claimed in claim 42 wherein the OFD comprises a grating.

47. A method as claimed in claim 46 wherein the grating comprises a fiber Bragg grating (FBG).

48. A method as claimed in claim 46 wherein the grating comprises a planar waveguide grating.

49. A method as claimed in claim 42 wherein the OFD comprises a Fabry-Perot filter (FPF).

50. A method as claimed in claim 31 further comprising the step of:
   c) generating a continuous wave (CW) signal, the step (a) performed by cross-modulating the CW signal with the optical data signal to produce a chirped CW signal that is the chirped signal produced by step (a).

51. A method as claimed in claim 31 wherein the step (b) includes the substep of enhancing optical amplitude of the chirped frequency components of the chirped signal to produce the optical clock signal.

52. A method as claimed in claim 31 wherein the non-chirp frequency components include an optical carrier signal, and the step (b) includes the substep of suppressing the optical carrier signal relative to the chirped frequency components of the chirped signal in generating the optical clock signal.

53. A method as claimed in claim 31 wherein the optical data signal includes a chirped CW signal, and the OFD suppresses the CW signal relative to the chirped frequency components of the chirped signal in generating the optical clock signal.

54. A method as claimed in claim 31 wherein the chirped signal produced by step (a) includes at least one optical pulse whose leading and trailing portions are chirped, the step (b) discriminating at least one of the blue-shifted and red-shifted components of the leading and trailing edges of the optical pulse, respectively, to generate the optical clock signal.

* * * * *

UNITED STATES PATENT AND TRADEMARK OFFICE
CERTIFICATE OF CORRECTION

PATENT NO. : 6,501,579 B2  
DATED : December 31, 2002  
INVENTOR(S) : Guifang Li et al.

Page 1 of 1

It is certified that error appears in the above-identified patent and that said Letters Patent is hereby corrected as shown below:

<u>Column 14,</u>
Line 20, after "and", delete "the".

Signed and Sealed this

Sixth Day of May, 2003

JAMES E. ROGAN
*Director of the United States Patent and Trademark Office*